United States Patent [19]
Melcher

[11] Patent Number: 5,134,026
[45] Date of Patent: Jul. 28, 1992

[54] PROCESS FOR MANUFACTURING A COMPRESSION-MOULDED SYNTHETIC RESIN OBJECT AND FABRICATED MATERIAL FOR USE IN SAID PROCESS

[75] Inventor: Gerhard Melcher, Vienna, Austria

[73] Assignee: Isovolta Osterreichische Isolierstoffwerk Aktiengesellschaft, Wiener Neudorf, Austria

[21] Appl. No.: 382,783

[22] PCT Filed: Oct. 24, 1988

[86] PCT No.: PCT/AT88/00083
§ 371 Date: Jul. 13, 1989
§ 102(e) Date: Jul. 13, 1989

[87] PCT Pub. No.: WO89/03753
PCT Pub. Date: May 5, 1989

[30] Foreign Application Priority Data
Oct. 23, 1987 [AT] Austria ................................ 2815/87

[51] Int. Cl.⁵ ............................................... B32B 5/16
[52] U.S. Cl. .................................... 428/326; 156/62.2; 156/62.8; 264/112; 264/113; 264/128
[58] Field of Search .......................... 156/62.2, 62.8; 264/112, 128, 113; 428/326

[56] References Cited

U.S. PATENT DOCUMENTS
3,843,431 10/1974 Fostalik ............................... 156/62.2

FOREIGN PATENT DOCUMENTS
791256 2/1958 United Kingdom ................ 264/113
939863 10/1963 United Kingdom ................ 156/62.2

Primary Examiner—John J. Gallagher
Attorney, Agent, or Firm—Bierman and Muserlian

[57] ABSTRACT

A process for the production of a synthetic resin pressure molded body in which a bonding agent containing a condensation resin or condensation resin mixture produced mainly on the basis of phenolic compounds and aldehydes in liquid or brushable form is heated to an elevated temperature to lower its viscosity and is applied to dried wood fibers in an amount of 25 to 50% of the amount of the wood fibers and optionally together with other materials such as surface and/or intermediate layers is hot pressed while the resin is hardening, whereby the moisture content of the dried wood fibers is at most 10%, the condensation resin or condensation resin mixture having a solid resin content of at least 80% by weight and a water content of at most 7% by weight and the bonding agent contains optional additives.

20 Claims, 3 Drawing Sheets

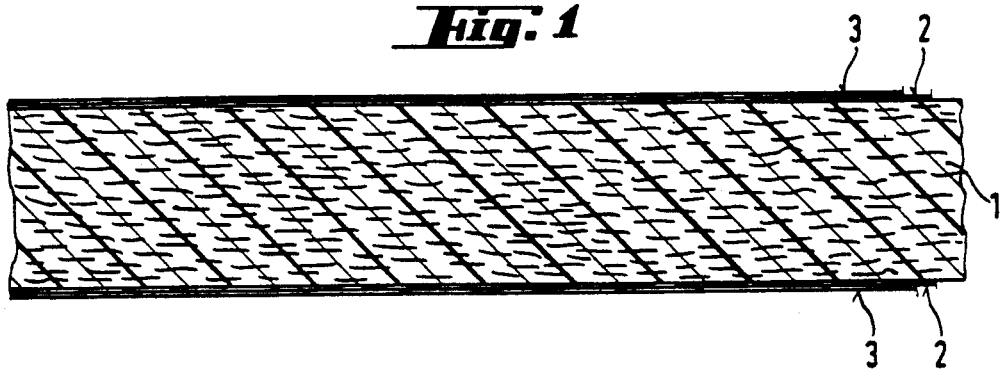
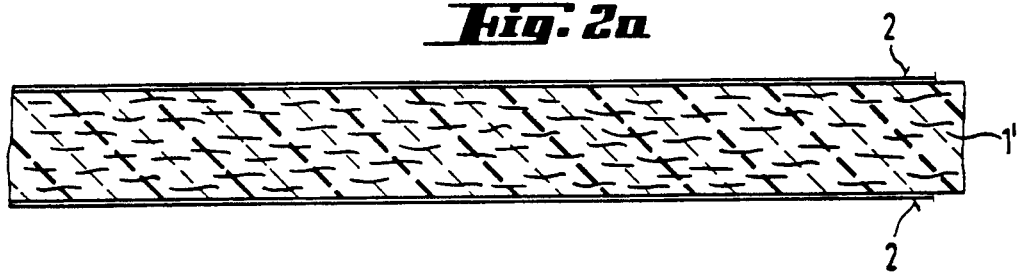

PROCESS FOR MANUFACTURING A COMPRESSION-MOULDED SYNTHETIC RESIN OBJECT AND FABRICATED MATERIAL FOR USE IN SAID PROCESS

TECHNICAL BACKGROUND

The present invention relates to a process for the production of a pressure molded body of synthetic resin plastic in which a bonding agent with a condensation resin or condensation resin mixture based on phenols and/or amino compounds and aldehydes such as formaldehyde (if necessary, in liquid form is applied to dry or dried wood chips and/or fibers for impregnation and, if necessary in combination with other materials such as covering and/or intemediate layers, is hot pressed during the hardening of the resin. In addition, the present invention relates to initial products which can be used in such a process.

PRIOR ART

A process of the above kind is known from U.S. Pat. No. 4,503,115. This patent relates to a process for the production of a decorative structural panel in which one applies an aqueous akaline solution or dispersion of a phenol-formaldehyde resin to wood fibers, and then dries the resin coated wood fibers to a residual moisture content of 2 to 15%. A fiber mat is then formed from the resin coated, dried wood fibers, and this is then mechanically preconsolidated and hot pressed in one or a plurality of layers arranged one above the other to form a core layer; the decorative layer can be applied to the core layer simultaneously with the pressing process or thereafter.

This known process is intended to produce a structural panel that has properties similar to those found in molded laminated plastic panels produced in the usual way, which are made by hot pressing so-called "pre-pregs," that are made of paper impregnated, when dry, with hardenable synthetic resins. However, as a result of the preferred orientation of the cellulose fibers of the paper in the direction preferred during the production of such paper, under varying climatic conditions such molded laminated plastic panels display shrinkage and stretch behavior that differ in the longitudinal or transverse direction of the paper, and this can have a disadvantageous effect. In addition, the papers that are used in such panels are a material produced from wood raw material, using a process that is costly and harmful to the ecology.

The anisotropy in the stretch and shrinkage behavior, which has been noted above, is avoided in panels produced according to the process described in U.S. Pat. No. 4,503,115 and, in addition, since to a very great extent wood fibers are used in place of paper, one can lower production costs compared to the conventional production of molded laminated plastic panels. However, the drying of the resin coated wood fibers remains a costly stage in the process and is, in some instances harmful to the environment.

EP 0,035,133 B1 also describes the production of decorative laminates. In this process, a powdered phenol resin is introduced into a current of moist air in which cellulose-like fibers are dispersed, so that the fibers and the phenol resins mix. The mixture of wood fibers and phenol resin is then deposited on a sieve-like band in the form of a layer, which after preconsolidation is intended for use in the same way as a paper "prepreg" that has been impregnated with resin, for the production of the laminate. However, the use of powdered resin in such fiber "prepregs" entails several fundamental disadvantages. First, there is a danger that the fibers and the powdered resin will become segregated during storage and transportation within the framework of the production process. In addition, phenol resins in powder form have a smaller low-molecular component than liquid phenol resins. As a result, during subsequent hot pressing, the resin does not flow as well, which can cause insufficient wetting and penetration of the resin through the fibers.

DESCRIPTION OF THE INVENTION

Thus, it is the purposes of the present invention to disclose a process of the type discussed in the introduction hereto, in which the disadvantages of the known process can be avoided by using a resin bonding agent that flows well when used.

The task that underlies the present invention is solved by the process according to the present invention that is characterized in that, at a moisture content of the dried wood chips and/or fibers of at most 10% wt. preferably 8% wt. a condensation resin or resin mixture that is liquid or that can be applied by brush, which has a solid resin content of at least 80% wt., a water content of at most 7% wt. preferably at most 5% wt. and which optionally contains additives such as coloring pigments, is used. When this is done, it is possible by simply adjusting the moisture content of the dried wood chips and/or fibers to the water content of the condensation resin, while allowing for the quantity of the additives that are used, to achieve a "volatile content" of the mass of the wood chips and/or fibers that are impregnated with the bonding agent of between 3 and 10%. This mass can be further processed without the need for a drying process. The volatile content of the mass of the wood chips and/or wood fibers impregnated with the bonding agent is governed by the weight loss that this mass exhibits when heated, e.g., in a drying cabinet, for 5 minutes at 165° C. To a great extent, this volatile content consists of water and, for example, phenol and low-molecular resin fractions. Its correct value is essential for good resin flow during the hot pressing process. If it is too low, the resin does not flow well, and if it is too high, the resin will harden during the pressing process.

The solid resin content is determined in a drying cabinet, in a dish with a weighed sample of approximately 0.5 grams, after drying for 60 minutes at 130° C. The water content of the resin is determined by the known Karl Fischer method.

According to an advantageous embodiment of the invention, the bonding agent is applied to the wood chips and/or fibers at an elevated temperature at which there is a reduction of the bonding-agent viscosity.

In an advantageous configuration of the process according to the present invention, the bonding agent, in liquid form, is applied to the wood chips and/or fibers in several steps; the viscosity of the bonding agent applied being lower in the first step than in the other steps. When this is done, the low viscosity bonding agent that is applied during the first step penetrates into the wood chips and/or fibers, whereas the higher viscosity bonding agent that is applied in the second or in the subsequent steps serves mainly to bond the wood chips and- /or fibers together during the production of the high pressure molded body.

According to another advantageous configuration of the present invention, during production of a high pressure molded body that is based on wood chips and a condensation resin that is predominantly based on phenols, the quantity of resin that is applied amounts to between 35 and 55% wt. of the quantity of the wood chips and additives. During the production of a high pressure molded body based on wood fibers, the quantity of bonding agent applied amounts to between 25 and 50% wt. of this quantity, whereas during the production of a high pressure molded body with a condensation resin based predominantly on amino compounds, the quantity of resin applied is between 80 and 160% wt. of the quantity of wood chips and/or fibers and additives.

In a further advantageous configuration of the present invention the wood chips and/or fibers impregnated with the bonding agent are applied on a base in one layer and then pressed so as to form a rough-pressed block or mat, which can be handled or transported, that forms at least part of the mass that its to be pressed during the production of the high pressure molded body. When this is done, the wood chips and/or fibers impregnated with the bonding agent are applied as a layer on an optionally flat carrier material, which bonds with the wood chips and/or fibers during the subsequent consolidation and forms part of the rough-pressed block. Alternatively an optionally flat carrier material can be laid onto the wood chips and/or fibers that have been coated with the bonding agent and applied as a layer on a base, this carrier material then bonding with the wood chips and/or fibers when they are subsequently consolidated, to form a part of the rough-pressed block. In addition, the carrier materials that are used can advantageously be coated or impregnated with a hardenable bonding agent.

According to another advantageous configuration of the present invention a wood fiber insulating panel or wood fiber mat is provided on one or both sides with layers of bonding agent which penetrate at least partly into this insulating panel or mat, when the insulating panel or mat that has been so coated with bonding agent forms at least part of the mass pressed during production of the high pressure molded body.

According to a last advantageous configuration of the invention, a plurality of the cited rough-cast blocks and/or wood fiber insulating panels or wood fiber mats that have been coated with bonding agent are arranged one above the other and subjected to hot pressing.

In addition, the present invention relates to initial products in the form of rough-pressed blocks or wood fiber insulating panels impregnated with synthetic resin such as are produced during the process of the present invention and used during the production of the high pressure molded bodies.

BRIEF DESCRIPTION OF THE DRAWINGS

FIG. 1 shows a sectional view of a panel-like high pressure molded body, the production of which is described in Example 1.

FIGS. 2a and 2b relate to Example 2, FIG. 2a showing a rough-pressed block and FIG. 2b showing a finished high pressure molded body.

A DESCRIPTION OF SOME WAYS FOR IMPLEMENTING THE INVENTION

Example 1

Figure 3A:
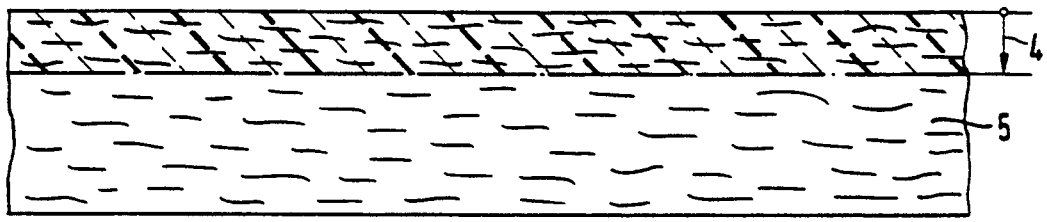
FIGS. 3a, 3b and 3c relate to Example 3, FIG. 3a showing an insulating panel coated on one side with synthetic resin, FIG. 3b showing an insulating panel coated on both sides with synthetic resin, and FIG. 3c showing a high pressure molded body produced from a plurality of insulating panels of this kind.

Wood chips, of the sort used for the surface layers during production of wood chips panels, are dried in a drier to a moisture content of 3.0% and then mixed with a highly concentrated phenolic resin (solid resin content: 82%, water content: 1.8%), heated to 40° C. in order to reduce its viscosity, with a resin application quantity of 40%. This results in a water content of the chips coated with the resin of 2.65%.

A press with circulating pressure plates was used to form the high pressure molded body. The following were applied one on top of the other, in the sequence indicated: a separating foil, a decor paper impregnated with a melamine resin with a resin application of 140% and with a weight per unit area of 100 g/m$^2$, and a soda kraft paper (200 g/m$^2$) impregnated with phenolic resin, with a resin application of 40%. Then a layer, approximately 90 mm thick, of chips impregnated with resin, at a spread density of 0.15 kg/1 was built up. The same impregnated papers or the separator foil as were used to form a base for the layer of chips were then applied to the layer of chips but in the reverse order. This whole structure was then placed on the pressure plate in the press and compressed for 20 minutes at a pressure of 70 bar and a temperature of 140° C. The synthetic resins contained in the layer of chips and in the impregnated papers thereby flow and harden in sequence. When the press cooled down the finished panel-like high pressure molded body was removed from the press. Its structure is shown in FIG. 1. The compact plastic core with the incorporated wood chip material is numbered 1, and this is coated on both sides with the impregnated soda kraft paper and decor paper layers 2 or 3, respectively, which have decorative surfaces of continous, pore-free melamine resin.

At a thickness of 10 mm, the panel-like high pressure molded body so formed has a density of approximately 1.4 g/cm$^3$, a flexural strength of 90 N/mm$^2$ (DIN 53799), a tensile strength of 52 N/mm$^2$ and a water absorption capacity of 0.9% (DIN 53799).

For reasons of production technology it may be expedient during the production of the high pressure molded body as a pressed substance, which contains the wood chips and/or fibers, to proceed from initial products that can be handled and/or transported and which can be used in the same manner as is the case with the prepregs in the conventional production of synthetic resin molded laminated plastic panels. Variations of the process according to the present invention, in which such initial products are used, are described below on the basis of Examples 2 to 4.

Example 2

In this example, wood fibers produced in the usual manner, which are first dried to a moisture content of 4% and coated with a highly concentrated phenolic resin as a bonding agent (solid resin content: 83.5%; water content: 2.2%) were used as a starting material.

In order to produce a panel-like rough-pressed block, a heated multistage press was used, such as can produce a compression pressure of 20–25 bar. A separator foil and then a sodium kraft paper (200 g/m$^2$) impregnated with a phenolic resin at 40% resin application were applied as a lower surface layer and then the coated wood fibers were applied to a layer thickness of 210 mm (layer weight 0.02 kg/$^l$). This fiber was then covered with the same impregnated sodium kraft paper as was used for the lower surface layer and then covered with a separator foil. The whole structure was then placed on the pressure plate in the press and compacted at a pressure of 20 bar, at a temperature of 80° C., for 5 minutes. A panel-like rough-pressed body that is approximately 7 mm thick was obtained and this was then removed hot out of the press to be used as a preproduct that can be handled and transported, during the production of the high pressure molded bodies.

The structure of this rough-pressed block is shown in FIG. 2a, wherein the prepressed plastic core with the incorporated wood fibers is number 1' and the upper and lower surface layers of the impregnated sodium kraft paper are numbered 2.

In order to produce the high pressure molded body shown in cross section in FIG. 2b, a structure is built up of the following, applied in the order shown:
a pressure plate with a surface structure
a separator foil
a decor paper (200 g/m$^2$) impregnated with malamine resin at
110% resin application
two of the above-described rough-pressed blocks
the same impregnated decor paper as above
a separator foil
a second pressure plate with a surface structure.

This is then compacted in a high pressure press at a pressure of 70 bar at a temperature of 140° C. for 20 minutes, and hardened. Once the press has cooled down the panel that has been so produced, and which has a decorative and structured surface, is removed from the press. This panel is 6 mm thick, and has a specific weight of 1.4 g/cm$^3$, a flexural strength of 90 N/mm$^2$, and a water absorption capacity of 0.6%.

According to another variation of this example, urea resin, which is cheaper than phenolic resin, can be added to the phenolic resin, at a quantity of approximately 10%. This addition causes no significant change in the quality of the panel produced.

Example 3

In order to produce a panel-like initial product for the production of a high pressure molded body, a wood fiber insulating panel such as is commercially available for construction purposes (e.g. a wood fiber insulating panel such as produced by Leitgeb, Kaernten) and which is 10 mm thick and of a specific weight of 0.25 g/cm$^3$, is adjusted, if necessary by drying, to a moisture content of approximately 5%. The insulating panel is coated by a single or repeated brush or sprayed application on one surface side with a highly concentrated phenolic resin to a temperature of 50° C. (solid resin content, 83%, water content: 2.7%), with a resin application of 40% relative to the weight of the panel (which is equal to 1 kg of resin per m$^2$ of panel surface). This resin is immediately absorbed by the fibrous panel material to form a layer approximately 3 mm thick on the surface of the panel. In addition to the wood fiber insulating panel coated on one side with phenolic resin, one can add insulating panels coated on both sides with resin for the later processing stages, for the production of which. After the application and absorption of the resin on one surface side of the panel, phenolic resin is applied and subsequently absorbed by the panel material in the same manner on the other surface side.

Figure 3B:
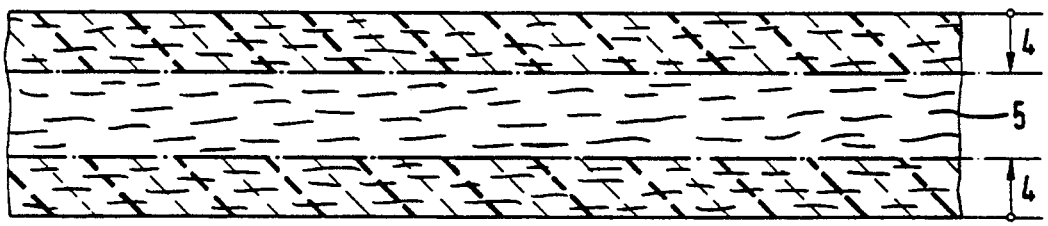
Figure 3C:
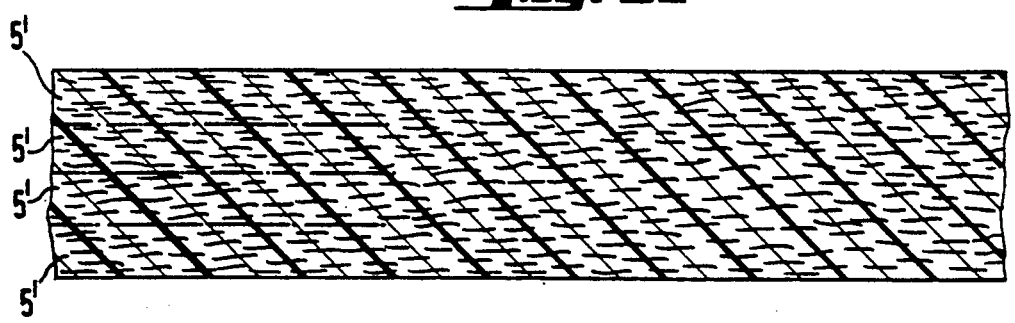

FIGS. 3a and 3b show an insulating panel 5 coated on one or both sides with bonding agent, in cross section, wherein the penetration depth of the bonding agent is numbered 4. In order to produce the panel shaped high pressure molded body on a pressure plate, between two separator foils, is placed a structure consisting of a wood fiber insulating panel that is resin-coated on both sides and, on this, three insulating panels resin coated on one side with the resin layer, being in each instance, on top. This structure is installed in a high pressure press and hot pressed. When this is done, the initial product structure is first heated to 100° C. during a heating phase, and then compressed to one-half of its original thickness and maintained at this temperature for 5 minutes. During this heating phase and the waiting period, the phenolic resin that is now free-flowing spreads through the pressed material and finally forms an even impregnation in the four wood fiber insulating panels 5' while the fiber structure is still loose. Next, the temperature and the pressure are increased to 140° C. and 70 bar and maintained at this for 20 minutes while the phenolic resin hardens.

The panel-like high pressure molded body that is removed from the press after cooling is 10 mm thick, has a flexural strength of 95 N/mm$^2$, a tensile strength of 70 N/mm$^2$, and a water absorption capability of approximately 0.8% once it has cooled down.

Example 4

Figure 4A:
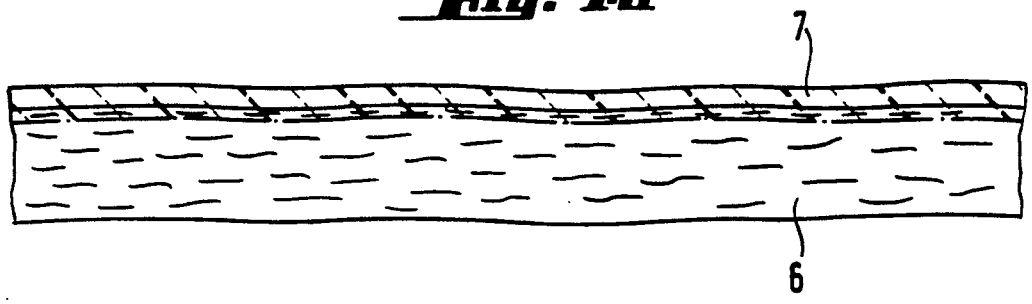
FIGS. 4a and 4b shows the embodiment described in Example 4, according to which a high pressure molded body is produced from a plurality of wood fiber mats that have been brushed [smeared] with bonding agent.

In order to produce a panel-like initial product, one proceeds from a wood fiber mat 6 (see FIG. 4a) of a bleached wood fiber material, 5 mm thick and with a specific weight of 0.10 g/m$^3$ (weight per unit area 0.05 g/cm$^2$), dried to a moisture content of 2.5%. A mixture of 30% wt. of solid melamine formaldehyde powder resin and 40% wt. of a partially methyletherified hexamethylol melamine and 30% TiO$^2$ as a pigment additive serves as the bonding agent. This mixture is heated to 50° C., at which it is highly viscose but can be applied by brush, and is applied to the wood fiber mat 6 in the form of an even, thick layer 7, when 0.075 g/cm$^2$ is applied. Immediately after this brush application the bonding agent layer 7 sinks slightly into the mat 6.

Figure 4B:
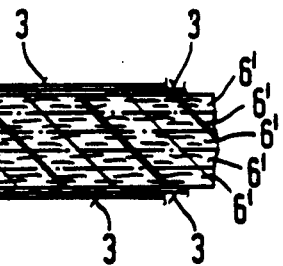

In order to produce the high pressure molded body shown in FIG. 4b, five resin coated wood fiber mats 6' are placed one on top of the other, covered on the upper and lower side in each instance with two white decor papers 3 impregnated with melamine resin, and then compressed in a high pressure press at 100° C. for 5 minutes to one half the volume of the crude mat to allow the bonding agent to impregnate the mats, and then pressed under high pressure at 75 bar for 20 minutes at 140° C. to form a 5 mm thick decorative panel this is white throughout its whole thickness.

Even though the above examples describe the production of panels, it is understood that other formed molded bodies can be produced using the inventive process.

UTILITY AND APPLICATION

The pressure molded bodies produced by the process according to the present invention can be used in the same areas as conventional decorative plastic resin high pressure laminates that are of greater thickness (e.g., between 3 and 15 mm thick), e.g., for the production of self-supporting structural elements or as weatherproof panels for exterior applications.

What is claimed is:

1. A process for the production of a synthetic resin pressure molded body in which a bonding agent containing a condensation resin or condensation resin mixture produced mainly on the basis of phenolic compounds and aldehydes in liquid form or brushable form is heated to an elevated temperature to lower its viscosity and applied to dried wood fibers in an amount of 25 to 50% of the amount of the wood fibers and optionally, together with other materials, such as surface and/or intermediate layers, is hot pressed while the resin is hardening, wherein the moisture content of the dried wood fibers is at most 10%, the condensation resin or condensation resin mixture has a solid resin content of at least 80% wt. and a water content of at most 7% wt., and the bonding agent contains optional additives.

2. A process as defined in claim 1, whereby the mass of the wood fibres can be further processed without a separate drying process after the application of the bonding agent.

3. A process as defined in claim 1, wherein the bonding agent in liquid form is applied to the wood fibres in several steps, the viscosity of the bonding agent to be applied being lower in the first step than it is in each of the other steps.

4. A process as defined in claim 1, wherein the wood fibres that have been impregnated with bonding agent are applied in one layer to a base and then compressed to form a rough-pressed block that can be handled or transported, that forms at least one part of the mass that is to be compressed during the production of the high pressure moulded body.

5. A process as defined in claim 4, wherein the wood fibres that have been impregnated with the bonding agent are applied in the form of a layer to an optionally flat carrier material which, during the subsequent compression of the wood fibres, bonds with these and forms a part of the rough-pressed block.

6. A process according to claim 4 wherein an optionally flat carrier material is applied to the wood fibres that have been impregnated with bonding agent and layered onto a base, this carrier material bonding with the wood fibres during the subsequent compression and forming a part of the rough-pressed block.

7. A process as defined in claim 5, wherein the carrier materials that are used are coated or impregnated with a bonding agent that can be hardened.

8. A process as defined in claim 1, wherein a wood fibre insulating panel or wood fibre mat is provided on one or both sides with layers of the bonding agent, which at least in part penetrates into this insulating panel or mat, the insulating panel or mat so coated with bonding agent and forming at least one part of the mass that is to be compressed during the production of the high pressure moulded body.

9. A process as defined in claim 4, wherein a plurality of such rough-pressed blocks and/or wood fibre insulating panels or wood fibre mats that have been coated with bonding agent arranged one above the other are hot-pressed with each other.

10. An initial product for use during the production of a synthetic resin high pressure moulded body, wherein this is a rough-pressed block or a wood fibre insulating panel or wood fibre mat that has been impregnated with synthetic resin, produced according to the method of claim 4.

11. A process for the production of a synthetic resin pressure molded body in which a bonding agent containing a condensation resin or condensation resin mixture produced mainly on the basis of amino compounds and aldehydes in liquid or brushable form is heated to an elevated temperature to lower its viscosity and applied to dried wood fibers in an amount of 80 to 160% wt. of the amount of the wood fibers and optionally, together with other materials such as surface and/or intermediate layers is hot pressed while the resin is hardening, wherein the moisture content of the dried wood fibers is at most 10%, the condensation resin or condensation resin mixture has a solid resin content of at least 80% wt. and a water content of at most 7% wt., and the bonding agent contains optional additives.

12. A process of claim 11 wherein the mass of the wood fibers is further processed without a separate drying process after the application of the bonding agent.

13. A process of claim 11 wherein the bonding agent in liquid form is applied to the wood fibers in several steps, the viscosity of the bonding agent being lower in the first step than it is in each of the other steps.

14. A process of claim 11 wherein the wood fibers impregnated with the bonding agent are applied in one layer to a base and then compressed to form a rough-pressed block that can be handled or transported to form at least one part of the mass that is to be compressed during the production of the high pressure molded body.

15. A process of claim 14 wherein the wood fibers impregnated with the bonding agent are applied in the form of a layer to an optionally flat carrier material which, during the subsequent compression of the wood fibers, bonds with these to form a part of the rough-pressed block.

16. A process of claim 14 wherein an optionally flat carrier material is applied to the wood fibers impregnated with bonding agent and layered onto a base, this carrier material bonding with the wood fibers during the subsequent compression to form a part of the rough-pressed block.

17. A process of claim 15 wherein the carrier materials are coated or impregnated with a bonding agent that can be hardened.

18. A process of claim 11 wherein a wood fiber insulating panel or wood fiber mat is provided on one or both sides with layers of the bonding agent, which at least in part penetrates into this insulating panel or mat, the insulating panel or mat so coated with bonding agent and forming at least part of the mass that is to be compressed during the production of the high pressure molded body.

19. A process of claim 14 wherein a plurality of rough-pressed blocks and/or wood fiber insulating panels or wood fiber mats that have been coated with bonding agent arranged one above the other are hot-pressed together.

20. An initial product for use during the production of a synthetic resin high pressure molded body, comprising a rough-pressed block or a wood fiber insulating panel or wood fiber mat impregnated with synthetic resin, produced by the process of claim 14.

* * * * *